United States Patent
Yabe et al.

(10) Patent No.: US 10,978,923 B2
(45) Date of Patent: Apr. 13, 2021

(54) ELECTRIC MOTOR, COMPRESSOR, AIR BLOWER, AND AIR CONDITIONER

(71) Applicant: Mitsubishi Electric Corporation, Tokyo (JP)

(72) Inventors: Koji Yabe, Tokyo (JP); Yoshikazu Fujisue, Tokyo (JP); Kazuya Kumagai, Tokyo (JP); Takahiro Tsutsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/463,477

(22) PCT Filed: Jan. 31, 2017

(86) PCT No.: PCT/JP2017/003303
§ 371 (c)(1),
(2) Date: May 23, 2019

(87) PCT Pub. No.: WO2018/142444
PCT Pub. Date: Aug. 9, 2018

(65) Prior Publication Data
US 2019/0356185 A1  Nov. 21, 2019

(51) Int. Cl.
*H02K 1/27* (2006.01)
*F04D 13/06* (2006.01)
(Continued)

(52) U.S. Cl.
CPC ........... *H02K 1/2766* (2013.01); *F04D 13/06* (2013.01); *H02K 21/14* (2013.01); *H02K 29/03* (2013.01); *H02K 2213/03* (2013.01)

(58) Field of Classification Search
CPC ........ H02K 21/16; H02K 21/14; H02K 1/276; H02K 1/2766; H02K 2213/03; H02K 29/03; F04D 13/06; F04D 25/0606
See application file for complete search history.

(56) References Cited

U.S. PATENT DOCUMENTS

| 2002/0171308 A1 | 11/2002 | Inayama et al. |
| 2008/0018190 A1* | 1/2008 | Takahata ............. H02K 1/276 |
| | | 310/156.56 |

(Continued)

FOREIGN PATENT DOCUMENTS

| CN | 101110528 A | 1/2008 |
| CN | 101529698 A | 9/2009 |

(Continued)

OTHER PUBLICATIONS

Office Action dated Aug. 4, 2020 in connection with counterpart CN patent Application No. 201780083751.6 (and a machine English translation).

(Continued)

*Primary Examiner* — Tran N Nguyen
*Assistant Examiner* — Leda T Pham
(74) *Attorney, Agent, or Firm* — Posz Law Group, PLC

(57) ABSTRACT

An electric motor includes a stator and a rotor including a permanent magnet and an electromagnetic steel sheet. The electromagnetic steel sheet includes a magnet insertion hole, a first outer peripheral surface including an inter-pole part of the rotor, a second outer peripheral surface including a magnetic pole center part of the rotor, a first slit elongated in a circumferential direction of the rotor, and a first portion formed between the first slit and the magnet insertion hole. A distance from the first outer peripheral surface to the stator is larger than a distance from the second outer peripheral surface to the stator. The electric motor satisfies $\theta a < \theta b$, where $\theta a$ is a first angle formed by a first line and a second line and $\theta b$ is a second angle formed by a third line and the second line.

10 Claims, 9 Drawing Sheets

(51) Int. Cl.
  *H02K 21/14* (2006.01)
  *H02K 29/03* (2006.01)

(56) References Cited

U.S. PATENT DOCUMENTS

| | | | | |
|---|---|---|---|---|
| 2010/0119390 A1* | 5/2010 | Baba | ................... | H02K 1/276 |
| | | | | 417/423.7 |
| 2011/0050022 A1 | 3/2011 | Li et al. | | |
| 2014/0368081 A1* | 12/2014 | Yabe | ................... | H02K 29/03 |
| | | | | 310/216.092 |
| 2015/0256038 A1* | 9/2015 | Nigo | ................... | H02K 1/02 |
| | | | | 62/498 |

FOREIGN PATENT DOCUMENTS

| | | | |
|---|---|---|---|
| CN | 103999329 | A | 8/2014 |
| EP | 2117102 | A1 | 11/2009 |
| EP | 2800243 | A1 | 11/2014 |
| JP | 2002-084693 | A | 3/2002 |
| JP | 2008-099418 | A | 4/2008 |
| WO | 2008/139675 | A1 | 11/2008 |

OTHER PUBLICATIONS

Office Action dated Feb. 5, 2021 issued in corresponding to CN patent Application No. 201780083751.6 (and English machine translation).

* cited by examiner

ELECTRIC MOTOR, COMPRESSOR, AIR BLOWER, AND AIR CONDITIONER

CROSS REFERENCE TO RELATED APPLICATION

This application is a U.S. national stage application of International Patent Application No. PCT/JP2017/003303 filed on Jan. 31, 2017, the disclosure of which is incorporated herein by reference.

TECHNICAL FIELD

The present invention relates to an electric motor including a stator and a rotor.

BACKGROUND ART

A rotor generally used for an electric motor is a rotor including a magnetic pole center part having a maximum outer diameter and an inter-pole part having an outer diameter smaller than the outer diameter of the magnetic pole center part. In an electric motor using this rotor, the distance between an outer peripheral surface of the rotor including the magnetic pole center part and a stator is smaller than the distance between an outer peripheral surface of the rotor including the inter-pole part and the stator. As a result, the magnitude of the magnetic flux density in the circumferential direction of the rotor can approach a sine wave and consequently torque ripples can be reduced (see, for example, Patent Reference 1).

PATENT REFERENCE

Patent Reference 1: Japanese Patent Application Publication No. 2008-99418

In an electric motor disclosed in Patent Reference 1, a magnetic pole center part and an inter-pole part of a rotor have different outer diameters, the distance between an outer peripheral surface of the rotor including the magnetic pole center part and the stator is smaller than the distance between an outer peripheral surface of the rotor including the inter-pole part and the stator. Thus, the magnitude of the magnetic flux density in the circumferential direction of the rotor can approach a sine wave and consequently torque ripples can be reduced. In the electric motor disclosed in Patent Reference 1, however, magnetic flux leakage easily occurs, specifically, magnetic flux from a permanent magnet easily flows toward an inter-pole part side (e.g., an adjacent permanent magnet). To adjust a flow of magnetic flux, a method of forming a slit in an electromagnetic steel sheet of the rotor is employed. This method, however, has a problem of decreasing structural strength of the rotor depending on the shape of the slit.

SUMMARY

It is therefore an object of the present invention to reduce torque ripples, to reduce magnetic flux leakage, and to suppress a decrease in structural strength of an electric motor.

An electric motor of the present invention includes: a stator; and a rotor disposed inside the stator, including a permanent magnet and an electromagnetic steel sheet, and having a plurality of magnetic poles. The electromagnetic steel sheet includes a magnet insertion hole in which the permanent magnet is inserted, a first outer peripheral surface including an inter-pole part located at a position between two adjacent magnetic poles of the plurality of magnetic poles, a second outer peripheral surface adjacent to the first outer peripheral surface and including a magnetic pole center part located at a center of the permanent magnet, and a first slit formed outside the magnet insertion hole in a radial direction of the rotor. The first slit is elongated in a circumferential direction of the rotor. A minimum distance from the first outer peripheral surface to the stator is larger than a minimum distance from the second outer peripheral surface to the stator. The electric motor satisfies $\theta a < \theta b$, where $\theta a$ is a first angle formed, on a first plane that is a plane perpendicular to an axial direction, by a first line from a boundary between the first outer peripheral surface and the second outer peripheral surface to a rotation center of the rotor on the first plane and a second line passing through the inter-pole part of the rotor and the rotation center, and $\theta b$ is a second angle formed, on the first plane, by the second line and a third line passing through the rotation center and an end portion of the first slit on a magnetic pole center side in the circumferential direction.

According to the present invention, torque ripples can be reduced, magnetic flux leakage can be reduced, and decrease in the structural strength of an electric motor can be suppressed.

DETAILED DESCRIPTION

First Embodiment

An electric motor 1 according to a first embodiment of the present invention will be described hereinafter.

In an xyz orthogonal coordinate system shown in each drawing, a z-axis direction (z axis) represents a direction parallel to an axis Ax (rotation center of a rotor 2) of a shaft 26 of the electric motor 1 (hereinafter referred to as an "axial direction"), an x-axis direction (x axis) represents a direction perpendicular to the z-axis direction (z axis), and a y-axis direction represents a direction perpendicular to both the z-axis direction and the x-axis direction.

Figure 1:
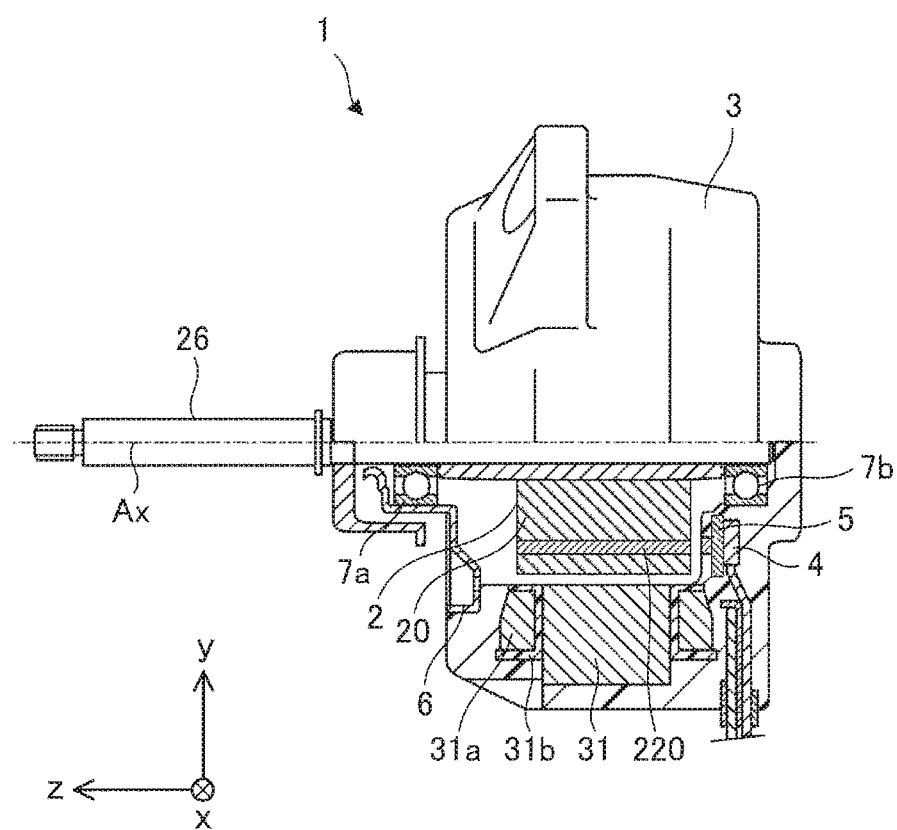
FIG. 1 is a partial cross-sectional view schematically illustrating a structure of an electric motor according to a first embodiment of the present invention.

FIG. 1 is a partial cross-sectional view schematically illustrating a structure of the electric motor 1 according to the first embodiment of the present invention.

Figure 2:
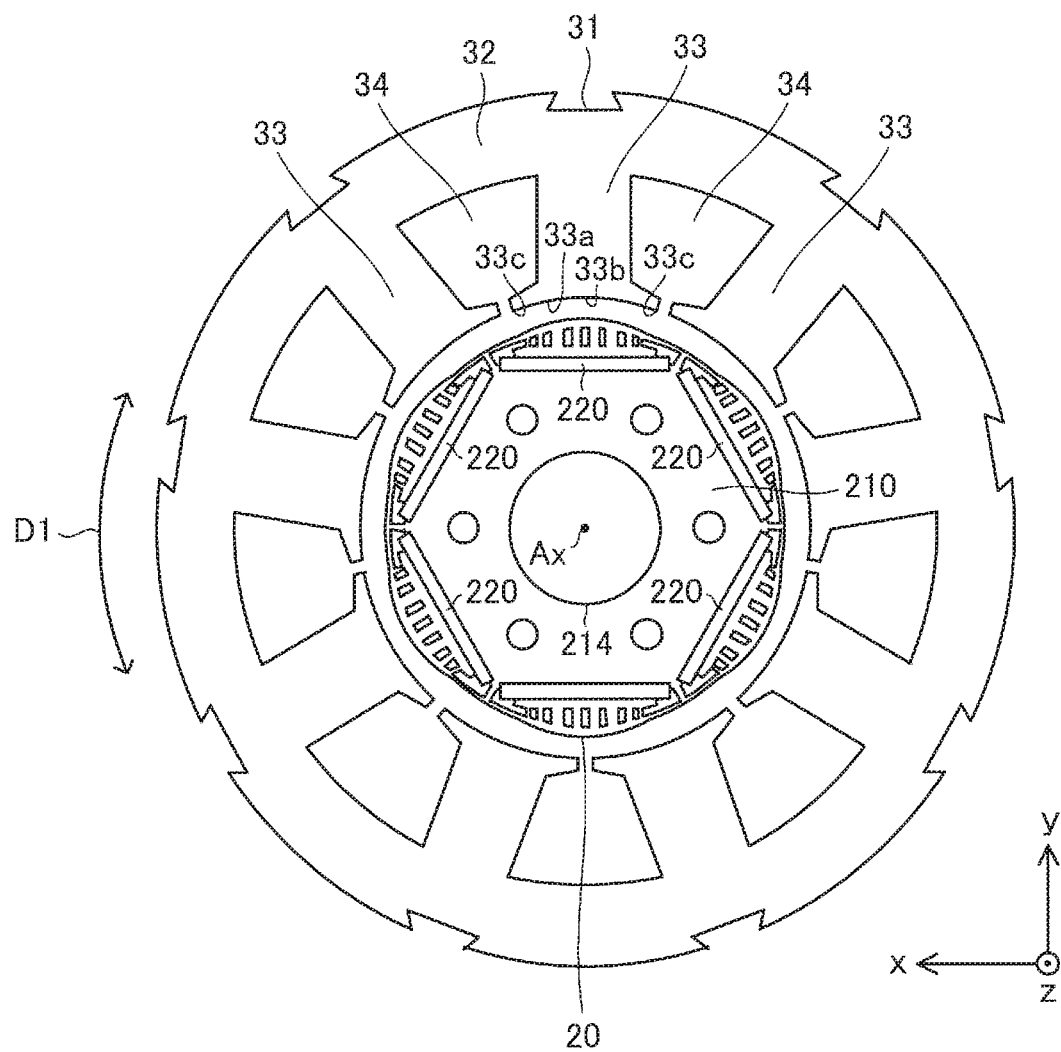
FIG. 2 is a plan view schematically illustrating structures of a rotor core in which permanent magnets are disposed and a stator core.

FIG. 2 is a plan view schematically illustrating structures of a rotor core 20 in which permanent magnets 220 are disposed, and a stator core 31. An arrow D1 represents a direction along the outer peripheries of the rotor core 20, the rotor 2, and the stator core 31 (hereinafter referred to as a circumferential direction).

The electric motor 1 includes the rotor 2, a stator 3, a circuit board 4, a magnetic sensor 5 for detecting a rotation position of the rotor 2, a bracket 6, and bearings 7a and 7b. The electric motor 1 is, for example, a permanent magnet-embedded electric motor (brushless DC motor). Electronic components such as a control circuit and a magnetic sensor 5 are mounted on the circuit board 4.

The rotor 2 is disposed inside the stator 3. The rotor 2 includes the rotor core 20, at least one permanent magnet 220, and the shaft 26. A rotational shaft of the rotor 2 coincides with the axis Ax. The shaft 26 is fitted in a shaft hole 214 formed in a center portion (center portion on an xy plane) of the rotor 2.

The stator 3 includes the stator core 31, a coil 31a, and an insulator 31b. The stator core 31 is formed by stacking a plurality of electromagnetic steel sheets in the axial direction. The stator core 31 has a ring shape. The coil 31b is formed by, for example, winding a lead wire around teeth 33 of the stator core 31 with the insulator 31b interposed therebetween. The coil 31a is insulated by the insulator 31b. In this embodiment, the stator core 31, the coil 31a, and the insulator 31b are covered with a thermoplastic resin (molding resin) such as an unsaturated polyester resin.

The stator core 31 includes a yoke 32, the plurality of teeth 33, and a plurality of slots 34. In the example illustrated in FIG. 2, the stator core 31 includes nine teeth 33 and nine slots 34. The slots 34 are spaces formed between the teeth 33.

The teeth 33 project toward the inside of the stator 3 (stator core 31). In other words, the teeth 33 extend from the yoke 32 toward the axis Ax. The teeth 33 have front faces 33a (teeth front faces) facing the rotor 2. A tooth center portion 33b is a center of each of the front faces 33a in the circumferential direction. A tooth end portion 33c is an end portion of each of the teeth 33 (specifically the front faces 33a) in the circumferential direction.

The rotor 2 is inserted in the stator 3 with a gap interposed therebetween. The bracket 6 is press fitted in an opening on a load side of the stator 3 (load side of the electric motor 1). The shaft 26 is inserted in the bearing 7a, and the bearing 7a is fixed on the load side of the stator 3. Similarly, the shaft 26 is inserted in the bearing 7b, and the bearing 7b is fixed on a counter-load side of the stator 3.

Next, a structure of the rotor core 20 will be described below.

Figure 3:
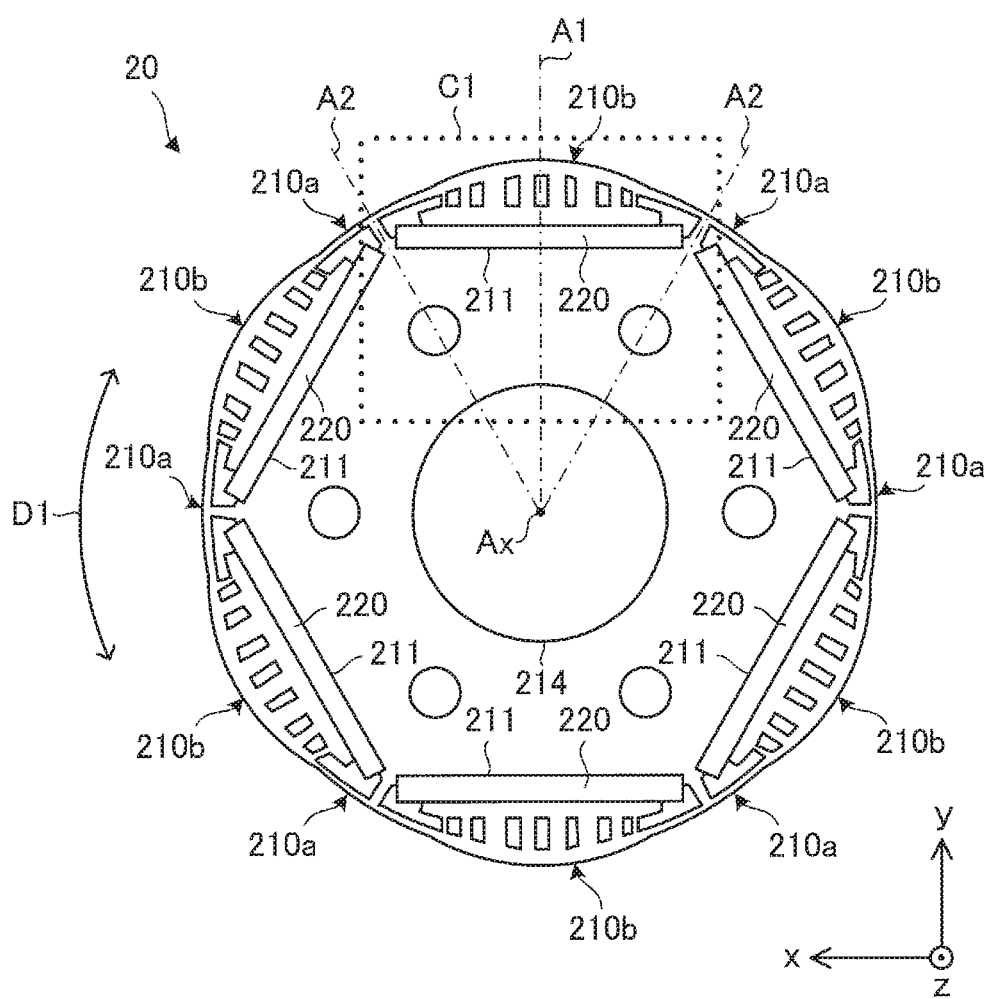
FIG. 3 is a plan view schematically illustrating a structure of the rotor core.
Figure 4:
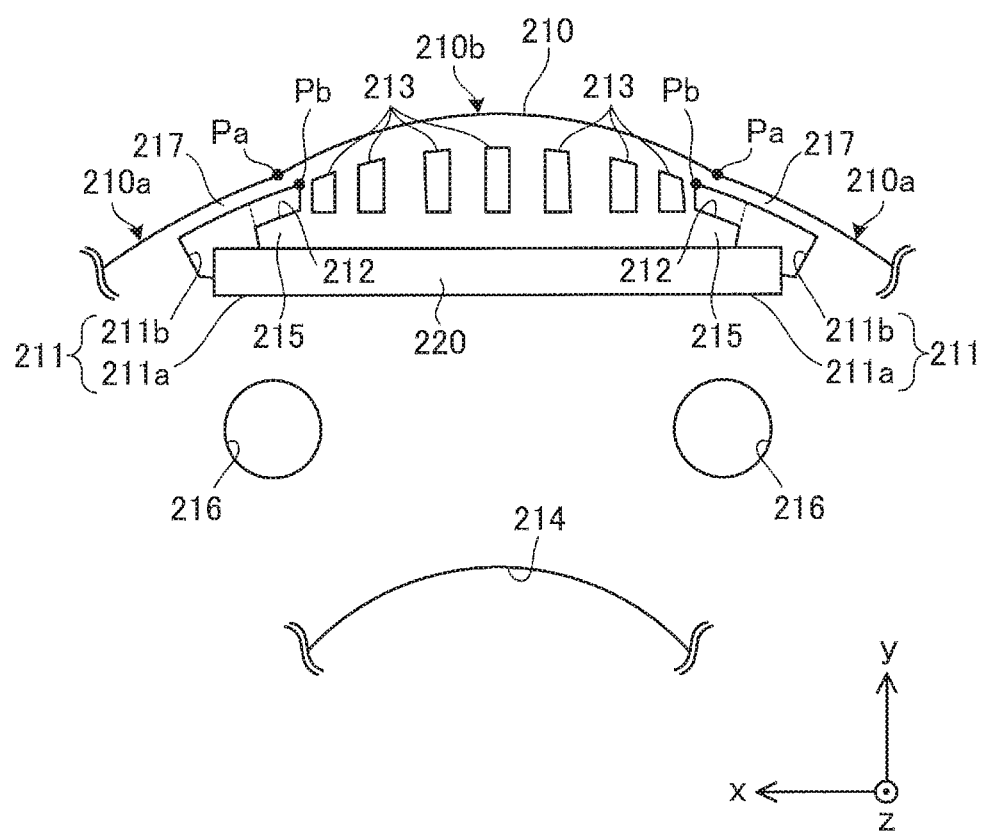
FIG. 4 is an enlarged view illustrating a region C1 indicated by a dotted line in FIG. 3.

FIG. 3 is a plan view schematically illustrating a structure of the rotor core 20. FIG. 4 is an enlarged view illustrating a region C1 indicated by a dotted line in FIG. 3. The permanent magnets 220 are disposed in the rotor core 20 (specifically, magnet insertion holes 211) illustrated in FIGS. 3 and 4.

As illustrated in FIG. 3, a magnetic pole center line indicating a magnetic pole center part (magnetic pole center position) of the rotor 2 (hereinafter referred to as a "magnetic pole center A1") passes through the center of each permanent magnet 220 (magnet insertion hole 211) in a longitudinal direction thereof (in the x-axis direction in the region C1 in FIG. 3) and the rotation center (axis Ax). An inter-pole line indicating an inter-pole part that is a position between two magnetic poles adjacent to each other in the circumferential direction (hereinafter referred to as an "inter-pole A2") passes between permanent magnets 220 (magnet insertion holes 211) adjacent to each other in the circumferential direction and the rotation center (axis Ax).

The rotor core 20 is formed by stacking a plurality of thin electromagnetic steel sheets 210 in the axial direction. Each of the electromagnetic steel sheets 210 is, for example, a non-oriented electromagnetic steel sheet. The non-oriented electromagnetic steel sheet is an electromagnetic steel sheet in which crystal axis orientations of the electromagnetic steel sheet are arranged at random in such a manner that magnetic properties (directions of magnetic flux) are not biased to a specific direction.

A thickness t0 of a single electromagnetic steel sheet 210 is 0.1 mm to 1 mm, for example. In this embodiment, each of the electromagnetic steel sheets 210 is formed in a predetermined shape. That is, in this embodiment, the plurality of electromagnetic steel sheets 210 have the same structure. The plurality of electromagnetic steel sheets 210 may include electromagnetic steel sheets having different structures.

Each of the electromagnetic steel sheets 210 includes at least one magnet insertion hole 211, one slit 212 (first slit) that is a through hole (gap), at least one slit 213 (second slit) that is a through hole (gap), and a shaft hole 214 in which the shaft 26 is inserted. Each of the electromagnetic steel sheets 210 further includes a first outer peripheral surface 210a including the inter-pole part (inter-pole A2), and a second outer peripheral surface 210b adjacent to the first outer peripheral surface 210a and including at least the magnetic pole center part (magnetic pole center A1).

In this embodiment, the outer peripheral surface of the rotor 2 (specifically, the rotor core 20) is constituted by the plurality of first outer peripheral surfaces 210a and the plurality of second outer peripheral surfaces 210b.

In addition, as illustrated in FIG. 4, the electromagnetic steel sheets 210 may include air openings 216.

Each of the electromagnetic steel sheets 210 is shaped in an arbitrary structure by, for example, punching (press work) using a die. The magnet insertion hole 211 includes a magnet insertion portion 211a and gap portions 211b communicating with the magnet insertion portion 211a.

In this embodiment, a plurality of magnet insertion holes 211 are formed in each electromagnetic steel sheet 210. In the example illustrated in FIG. 3, six magnet insertion holes 211 are formed at regular intervals in the circumferential direction, and penetrate the electromagnetic steel sheet 210 in the axial direction. The number of the magnet insertion holes 211 is not limited to the example illustrated in FIG. 3.

The magnet insertion portion 211a is rectangular in a lateral cross section (planar shape on the xy plane). The shape of the magnet insertion holes 211 is, however, not limited to the example illustrated in FIG. 3.

The gap portions 211b are formed at longitudinal end portions of the magnet insertion hole 211 and communicate with the magnet insertion portion 211a. In this embodiment, the gap portions 211b also communicate with the slits 212. In FIG. 4, the boundaries between the gap portions 211b and the slits 212 are represented as broken lines.

The permanent magnet 220 is inserted in each of the magnet insertion holes 201. Specifically, the permanent magnets 220 are inserted in the magnet insertion portions 211a. In this embodiment, the permanent magnet 220 disposed in one magnet insertion hole 211 constitutes one magnetic pole (a north pole or a south pole) of the rotor 2. The plurality of magnetic poles (north poles and south poles) are alternately arranged in the circumferential direction. In this embodiment, the rotor 2 includes six magnetic poles (three north poles and three south poles). A plurality of permanent magnets 220 may be disposed in one magnet insertion hole 211.

Each slit 212 is formed outside the magnet insertion hole 211 (specifically, the magnet insertion portion 211a) in the axial direction of the rotor 2 (rotor core 20) (hereinafter referred to simply as a radial direction), and is elongated in the circumferential direction. In this embodiment, the slits 212 communicate with the magnet insertion hole 211 (specifically, the gap portions 211b). That is, the gap portions 211b and the slits 212 are formed on both sides in the longitudinal direction of the permanent magnet 220. Since magnetic permeabilities of the gap portions 211b and the inside (gap portions) of the slits 212 are lower than that of the electromagnetic steel sheets, leakage flux can be reduced, and magnetic force of the permanent magnets 220 can be effectively used.

The slits 213 extend in the radial direction. In this embodiment, the plurality of slits 213 are formed outside the permanent magnets 220 (magnet insertion holes 211) in the radial direction. The slits 212 are formed outside the plurality of slits 213 in the circumferential direction.

The permanent magnets 220 are, for example, rare earth magnets containing, as a main component, at least one of neodymium, boron, or dysprosium. In this embodiment, the permanent magnets 220 contain iron, neodymium, boron, and dysprosium. The type of the permanent magnets 220 is not limited to the example described in this embodiment, and the permanent magnets 220 may be made of other materials.

The permanent magnets 220 are susceptible to various influences from magnetic flux from the stator 3, and thus, are preferably disposed as close to a rotation center side as possible. In general, suction force is generated between permanent magnets and electromagnetic steel sheets. In the electric motor 1 according to this embodiment, since the plurality of slits 212 and the plurality of slits 213 are formed outside the permanent magnets 220 (magnet insertion holes 211) in the radial direction, the suction force is more likely to occur inside the permanent magnets 220 than outside the permanent magnets 220 in the radial direction. Accordingly, in the electric motor 1, the permanent magnets 220 are easily attracted to radially inner sides (the rotation center side) in the magnet insertion holes 211, and are less susceptible to the influence of magnetic flux of the stator 3, advantageously.

In addition, as illustrated in FIG. 4, the electromagnetic steel sheet 210 includes thin portions 217 (second portions). The thin portions 217 are portions of the electromagnetic steel sheet 210 formed outside the slits 212 in the radial direction. The width of each electromagnetic steel sheet 210 located outside the slit 212 in the radial direction, that is, the width of the thin portion 217, increases from the inter-pole part (inter-pole A2) toward the magnetic pole center part (magnetic pole center A1). Accordingly, magnetic flux passing through the thin portion 217 increases from an inter-pole side toward a magnetic pole center side, and thus, the magnitude of magnetic flux of the rotor 2 in the circumferential direction approaches to a sine wave, and the level of an induced voltage can be made closer to the sine wave. As a result, torque ripples can be reduced and consequently noise of the electric motor 1 can be reduced.

On the other hand, since the magnetic flux density of the inter-pole part is preferably as close to zero as possible, the width of the thin portion 217 near the inter-pole part is preferably small and uniform.

Figure 5A:
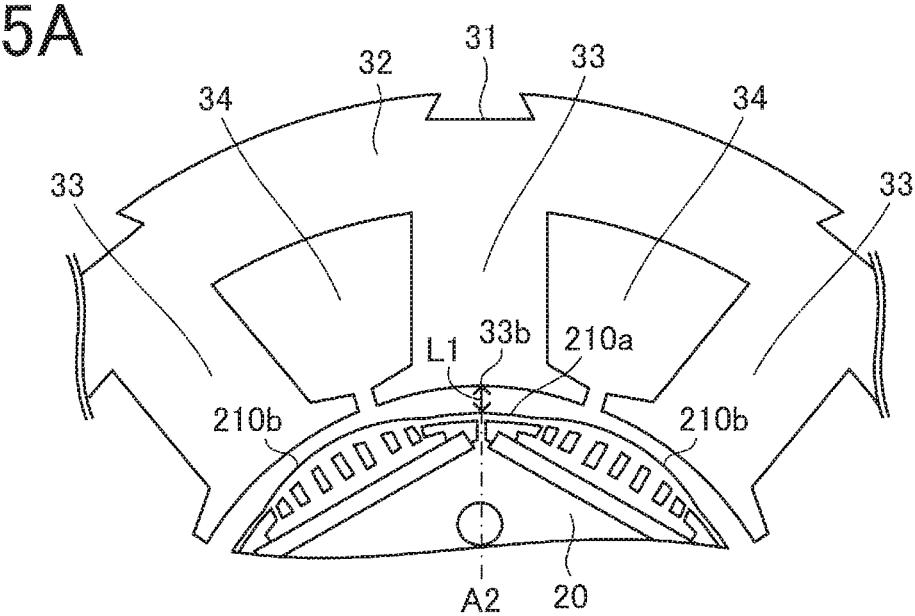
FIGS. 5A and 5B are diagrams illustrating a positional relationship between the rotor and the stator.
Figure 5B:
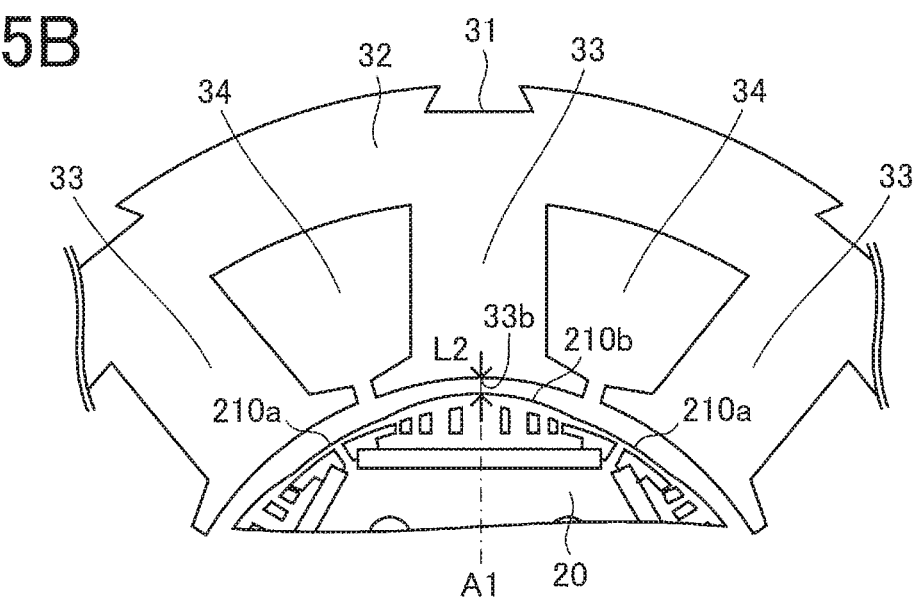

FIGS. 5A and 5B are diagrams illustrating a positional relationship between the rotor 2 (rotor core 20) and the stator 3 (stator core 31).

A distance L1 is a minimum distance from the first outer peripheral surface 210a of the rotor 2 to the stator 3. Specifically, the distance L1 is a minimum distance from the first outer peripheral surface 210a to the tooth 33 of the stator 3. In the example illustrated in FIG. 5A, the distance L1 is a minimum distance from the first outer peripheral surface 210a to the tooth center portion 33b in a state where the tooth center portion 33b is located on an extension line (extension line on the xy plane) of the inter-pole A2.

A distance L2 is a minimum distance from the second outer peripheral surface 210b to the stator 3. Specifically, the distance L2 is a minimum distance from the second outer peripheral surface 210b to the tooth 33 of the stator 3. In the example illustrated in FIG. 5B, the distance L2 is a minimum distance from the second outer peripheral surface 210b to the tooth center portion 33b in a state where the tooth center portion 33b is located on an extension line (extension line on the xy plane) of the inter-pole A1.

The distance L1 is larger than the distance L2. Thus, a gap between the rotor 2 and the stator 3 increases from the magnetic pole center A1 toward the inter-pole A2 along the outer peripheral surface of the rotor 2. In the circumferential direction of the rotor 2, since the magnetic flux density is at maximum in the magnetic pole center A1, the magnetic flux density gradually decreases toward the inter-pole A2. Accordingly, the magnitude of the magnetic flux density of the rotor 2 in the circumferential direction approaches a sine wave and consequently torque ripples can be reduced. As a result, noise of the electric motor 1 can be reduced.

The outer peripheral surface of the rotor 2 may be formed in such a manner that the gap between the rotor 2 and the stator 3 is partially uniform. In this case, a portion of the outer peripheral surface (e.g., the first outer peripheral surface 210a) near the inter-pole A2 is preferably formed in such a manner that the gap between the rotor 2 and the stator 3 is partially uniform. Accordingly, the gap between the rotor 2 and the stator 3 can be easily controlled. For example, a curvature of a portion of the first outer peripheral surface 210a is formed so as to be equal to a curvature of the front face 33a of the tooth 33. Since the magnetic flux density is small near the inter-pole A2, the influence on, for example, speed control is small even with a change of a curvature of the first outer peripheral surface 210a near the inter-pole A2.

Figure 6:
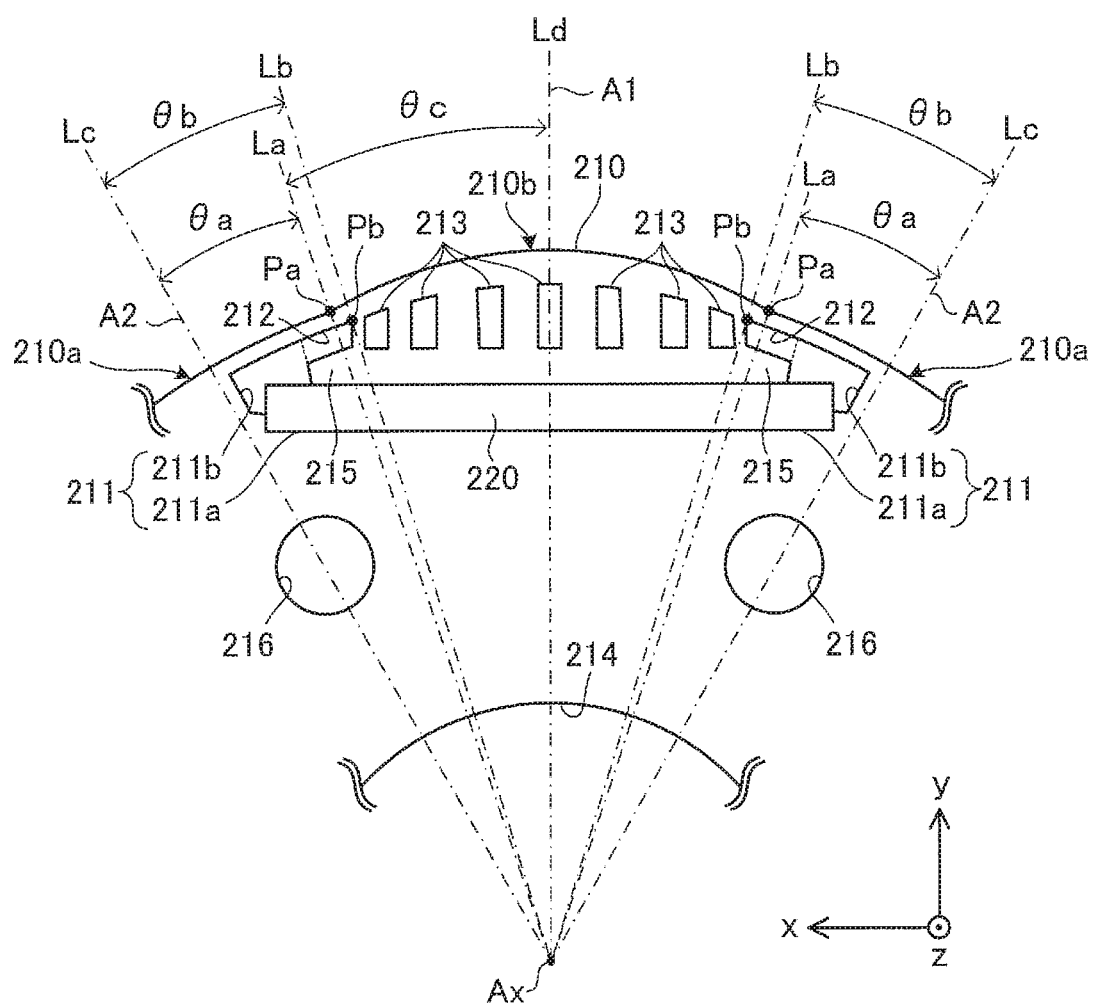
FIG. 6 is an enlarged view illustrating the region C1 indicated by the dotted line in FIG. 3.

FIG. 6 is an enlarged view illustrating the region C1 indicated by the dotted line in FIG. 3.

As described above, the electric motor 1 is configured such that the gap portions 211b and the slits 212 are formed to be long toward the magnetic pole center side and L1>L2 is satisfied. This configuration can reduce torque ripples, and can reduce magnetic flux leakage. In such a configuration, however, the thin portions 217 that are electromagnetic steel sheets located outside the slits 212 in the radial direction are elongated in the circumferential direction, and thus, the strength of the thin portions 217 is low.

In addition, in a rotor having a plurality of radiuses, stress is likely to be partially concentrated on the outer peripheral surface of the rotor. Specifically, in this embodiment, as illustrated in FIG. 6, since the radius of the rotor 2 passing through the magnetic pole center A1 is different from the radius of the rotor 2 passing through the inter-pole A2, boundaries Pa between the first outer peripheral surfaces 210a and the second outer peripheral surfaces 210b serve as inflection points. Thus, stress is likely to be concentrated on the boundaries Pa serving as inflection points, resulting in a decrease in structural strength of the electric motor 1.

Furthermore, in a case where the positions of end portions (corners) of slits formed in the electromagnetic steel sheets of the rotor are different in the radial direction from the positions of inflection points on the outer peripheral surface of the rotor, structural strength of the electric motor against centrifugal force and electromagnetic excitation force decreases. For example, strength against the centrifugal force and the electromagnetic excitation force can be enhanced by increasing the width of the thin portions that are electromagnetic steel sheets located outside the slits in the radial direction. In the case where the width of the thin portions is large, however, leakage flux passing through the thin portions increases, and thus, magnetic force of permanent magnets cannot be effectively used.

For example, in this embodiment, as illustrated in FIG. 6, an end portion Pb of the slit 212 on the magnetic pole center side in the circumferential direction serves as an inflection point, and stress is likely to be concentrated on this end. In view of this, in this embodiment, the rotor 2 (specifically, the rotor core 20) is formed such that the position of the boundary Pa does not overlap the position of the end portion Pb in the radial direction.

Specifically, as illustrated in FIG. 6, the relationship between an angle θa (first angle) and an angle θb (second angle) satisfy θa<θb.

The angle θa is an angle formed by a line La (first line) and a line Lc (second line) on a first plane (xy plane in this embodiment) that is a plane perpendicular to the axial direction. The line La is a line extending from the boundary Pa between the first outer peripheral surface 210a and the second outer peripheral surface 210b to the rotation center (i.e., the axis Ax) of the rotor 2 on the first plane (xy plane in this embodiment). The line Lc is a line passing through the inter-pole part (inter-pole A2) and the rotation center of the rotor 2.

The angle θb is an angle formed by a line Lb (third line) and the line Lc on the first plane (xy plane in this embodiment). The line Lb is a line passing through the rotation center of the rotor 2 and the end portion Pb of the slit 212 on the magnetic pole center side in the circumferential direction.

Since the electric motor 1 satisfies θa<θb, the rotor 2 can be configured such that the position of the boundary Pa does not overlap the position of the end portion Pb in the radial direction. Accordingly, in the rotor 2, portions on which strength is concentrated and portions on which strength is reduced can be dispersed. As a result, torque ripples can be reduced, magnetic flux leakage can be reduced, and a decrease in structural strength of the electric motor 1 can be suppressed.

On the other hand, in a case where the boundary Pa is located closer to the magnetic pole center side than the end portion Pb in the circumferential direction (i.e., θa>θb), a region of the first outer peripheral surface 210a including the inter-pole part (inter-pole A2) is elongated in the circumferential direction. Thus, a gap between the rotor 2 and the stator 3 when θa>θb is satisfied becomes larger than a gap between the rotor 2 and the stator 3 when θa<θb is satisfied.

Accordingly, when the electric motor 1 satisfies θa>θb, effective magnetic force of the permanent magnets 220 on the stator 3 decreases.

Thus, as described above, when the relationship between the angle θa and the angle θb satisfies not θa>θb but θa<θb, the magnetic force of the permanent magnets 220 can be sufficiently used, and a decrease in structural strength of the electric motor 1 can be suppressed.

The line Lc may be defined as a line passing through the magnetic pole center part (magnetic pole center A1) and the rotation center of the rotor 2. In this case, a relationship between the angle θa and the angle θb is θa>θb.

Moreover, each of the electromagnetic steel sheets 210 includes a first portion 215 that is a portion of the electromagnetic steel sheet 210 and is formed between the slit 212 and the magnet insertion hole 211 (specifically, the magnet insertion portion 211a). In the example illustrated in FIG. 6, the first portion 215 is formed along the slit 212 and is elongated in the circumferential direction.

For example, in a case where the first portion 215 that is a portion of the electromagnetic steel sheet 210 is not formed, the slit 212 communicates with the magnet insertion portion 211a and consequently the area of a portion of the permanent magnet 220 that is in contact with the air increases. In this case, permeance of the permanent magnet 220 decreases. Accordingly, magnetic flux from the permanent magnet 220 decreases and consequently demagnetization resistance of the permanent magnet 220 decreases. As a result, the magnetic force of the permanent magnet 220 decreases.

In view of this, to suppress a decrease in permeance of the permanent magnet 220, the area of a portion of the permanent magnet 220 that is in contact with the air is preferably as small as possible. Thus, in this embodiment, the slits 212 are formed to be elongated in the circumferential direction, and the first portion 215 is formed between the slit 212 and the permanent magnet 220.

In this embodiment, since the first portion 215 elongated in the circumferential direction is formed between the slit 212 and the magnet insertion hole 211 (specifically, the magnet insertion portion 211a), it is possible to elongate the slit 212 in the circumferential direction while minimizing the area of a portion of the permanent magnet 220 that is in contact with the air. Accordingly, a decrease in permeance of the permanent magnet 220 can be suppressed while the leakage flux is reduced.

When the first portion 215 is formed between the slit 212 and the magnet insertion hole 211 (specifically, the magnet insertion portion 211a), the weight of the electromagnetic steel sheets 210 increases, and stress in the rotor 2 due to the centrifugal force increases, as compared to a rotor not including the first portion 215. Accordingly, in some configurations of the rotor 2, stress is likely to be partially concentrated. In the electric motor 1 according to this embodiment, stress is likely to be concentrated on the boundaries Pa and the end portions Pb of the rotor 2, as compared to an electric motor including a rotor whose outer peripheral surface is a complete circle.

The width of the thin portion 217 in the radial direction may be increased in order to enhance rigidity against stress generated on the boundaries Pa and the end portions Pb of the rotor 2. However, when the width of the thin portion 217 in the radial direction is increased, the magnetic flux from the permanent magnets 220 easily passes through the thin portion 217 and consequently leakage flux easily occurs.

Thus, from the viewpoint of reducing the leakage flux, the width of the thin portion 217 in the radial direction is as small as possible.

In this embodiment, the electric motor 1 satisfies θa<θb and the first portion 215 is formed between the slit 212 and the magnet insertion hole 211 (specifically, the magnet insertion portion 211a) as described above. Accordingly, torque ripples can be reduced, magnetic flux leakage can be reduced, and a decrease in structural strength of the electric motor 1 can be suppressed, advantageously. In addition, an advantage of being able to suppress a decrease in permeance of the permanent magnets 220 can also be obtained.

Each of the electromagnetic steel sheets 210 further includes the plurality of slits 213 formed outside the magnet insertion holes 211 in the radial direction. Each of the slits 213 extends radially.

As described above, in the electric motor 1 according to this embodiment, since the boundaries Pa are located outside the thin portions 217 in the radial direction, the strength of the rotor 2 is lower than that in an electric motor including a rotor having a completely circular outer peripheral surface. Thus, it is preferable to reduce the centrifugal force and the amplitude of the electromagnetic excitation force, which cause stress on and around the thin portions 217.

Since the centrifugal force is proportional to the weight, reduction of the weight of the rotor 2 located radially outside can reduce the centrifugal force of the rotor 2. In this embodiment, since the plurality of slits 213 are formed radially outside the magnet insertion holes 211, the weight of the electromagnetic steel sheets 210 can be reduced and consequently the centrifugal force can be reduced. Accordingly, stress generated on and around the thin portions 217 can be reduced.

In addition, by reducing the amplitude of an electromagnetic excitation force, that is, by reducing a peak of the electromagnetic excitation force, stress generated on and round the thin portions 217 can be reduced. In order to reduce the amplitude of the electromagnetic excitation force, it is important to reduce reluctance torque and harmonics of an induced voltage. In this embodiment, since the plurality of slits 213 are formed outside the magnet insertion holes 211 in the radial direction, q-axis inductance is reduced, and the reluctance torque is reduced. In addition, since each of the slits 213 extends in the radial direction, the magnitude of the magnetic flux density in the circumferential direction approaches a sine wave and consequently harmonics of an induced voltage can be reduced.

As described above, since each of the electromagnetic steel sheets 210 includes the plurality of slits 213 formed outside the magnet insertion holes 211 in the radial direction, the centrifugal force and the amplitude of the electromagnetic excitation force can be reduced, and stress generated on and around the thin portions 217 can also be reduced. In addition, the plurality of slits 213 also contribute to reduction of torque ripples and consequently noise during rotation of the rotor 2 can be further reduced.

In the electric motor 1, if the ratio of the number of magnetic poles to the number of the slots 34 is 2:3, the angle θa is preferably an electrical angle of 30 degrees or more. Accordingly, the magnetic flux from the permanent magnets 220 can be effectively used. In the example illustrated in FIG. 2, the number of magnetic poles is six, and the number of the slots 34 is nine.

The electrical angle [degree] is an angle represented by a mechanical angle×(the number of poles/2). Thus, in a case where the number of magnetic poles is six and the mechanical angle is 10 degrees, the electrical angle is 30 degrees. By setting the angle θa at 30 degrees or more, the angle θc formed by a line Ld passing thorough the magnetic pole center A1 and the rotation center and the line La on the first plane (xy plane in this embodiment) is smaller than an electrical angle of 120 degrees (FIG. 4).

In this embodiment, the ratio of the number of magnetic poles to the number of the slots 34 is 2:3, and the teeth 33 are arranged at intervals of an electrical angle of 120 degrees. The second outer peripheral surfaces 210b are portions having a high magnetic flux density in the circumferential direction of the rotor 2. Thus, by setting the angle θc at a value smaller than 120 degrees, magnetic flux can be concentrated on the teeth 33 and consequently the magnetic flux from the rotor 2 (specifically, the permanent magnets 220) can be effectively used.

In addition, in this embodiment, since the relationship between the angle θa (first angle) and the angle θb (second angle) satisfies θa<θb as described above, the electric motor 1 preferably satisfies θb>θa≥30 degrees in terms of the electrical angle.

Figure 7:
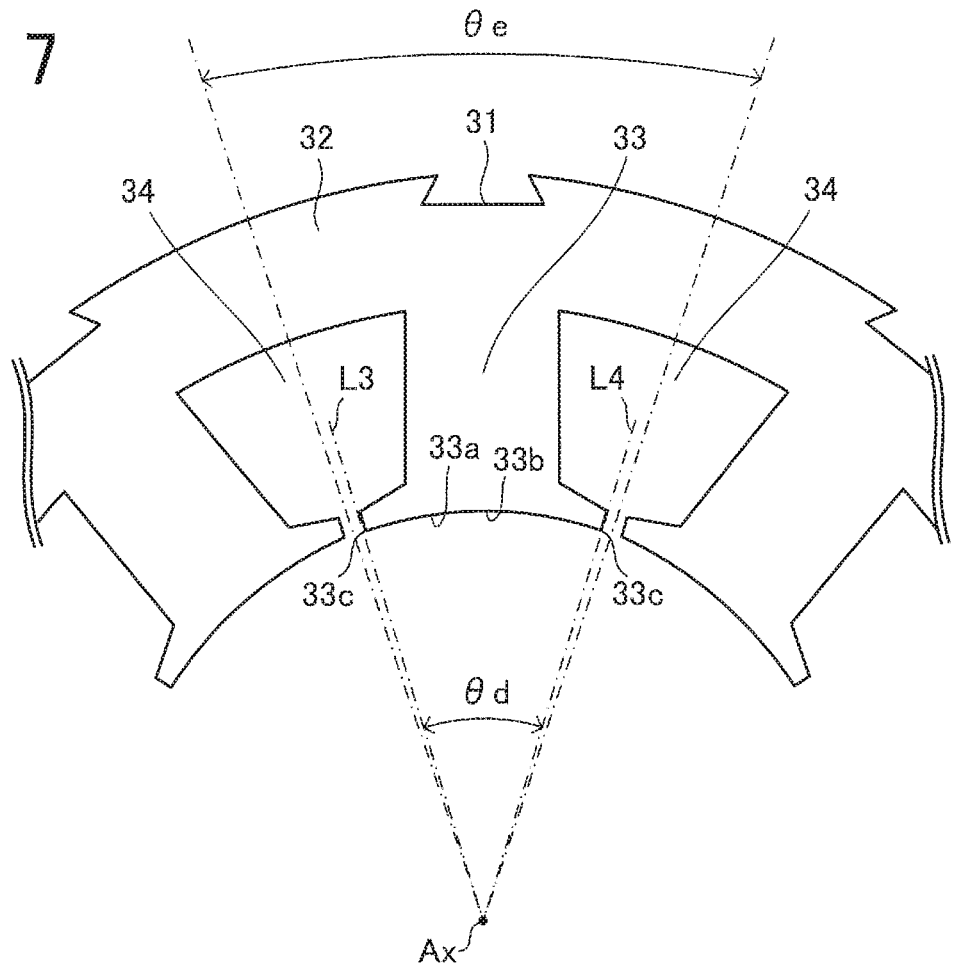
FIG. 7 is an enlarged view schematically illustrating a structure of a tooth.

FIG. 7 is an enlarged view schematically illustrating a configuration of the tooth 33.

An angle θe illustrated in FIG. 7 is an angle on the xy plane at which magnetic flux from the rotor 2 can be effectively obtained at each of the teeth 33. Specifically, the angle θe (mechanical angle) is an angle formed by the centers of two slots 34 adjacent to each other in the circumferential direction, and is obtained by 360 degrees/the number of the teeth 33.

In each of the teeth 33, since θd<θe is satisfied, the magnetic flux from the rotor 2 can be effectively obtained in the range indicated by the angle θd. Specifically, the angle θd is an angle formed, on the xy plane, by a line L3 passing through one end portion (tooth end portion 33c) of each of the teeth 33 in the circumferential direction and the rotation center (axis Ax), and a line L4 passing through the other end portion (tooth end portion 33c) of each of the teeth 33 in the circumferential direction and the rotation center (axis Ax).

On the other hand, in one magnetic pole of the rotor 2 (e.g., the range illustrated in FIG. 4), an effective angle of a magnetic pole is represented by (180−(2×θa)) [degree] in terms of the electrical angle. That is, the angle θb and the angle θd are adjusted such that the value represented by (180−(2×θb)) is close to the angle θd. Accordingly, the magnetic flux from the rotor 2 can be effectively used.

Thus, in the teeth 33, the angle θb (FIG. 4) and the angle θd (FIG. 7) preferably satisfy the following expression.

$$0.88 \leq (180-(2\times\theta b))/\theta d \leq 1.08$$

When the angle θb and the angle θd satisfy the expression, the magnetic flux from the rotor 2 can be effectively used.

Magnetic flux obtained by dividing the magnetic flux from the rotor 2 by the angle θe enters each tooth 33, and thus, if θd is replaced by θe, the above expression is still established. That is, in a case where the angle θb and the angle θe satisfy the following expression, the magnetic flux from the rotor 2 can also be effectively used.

$$0.88 \leq (180-(2\times\theta b))/\theta e \leq 1.08$$

Figure 8:
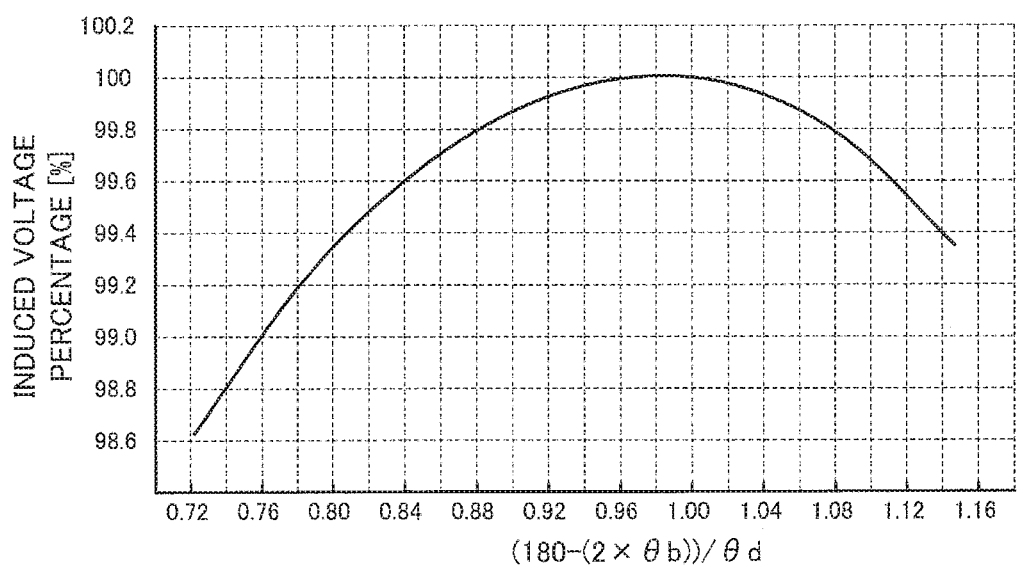
FIG. 8 is a diagram showing a relationship between a value V1 and an effective value of an induced voltage (induced voltage percentage [%]).

FIG. 8 is a diagram showing a relationship between a value V1 represented by (180−(2×θb))/θd and an effective value of an induced voltage (induced voltage percentage [%]).

As shown in FIG. 8, as the value represented by (180−(2×θb)) approaches the angle θd, that is, as the value V1 approaches 1 (one), the effective value of the induced voltage (hereinafter referred to simply as an "induced voltage") increases. If the value V1 is near 1 (one), for example, if 0.88≤V1≤1.08, a change rate of the induced voltage is small. Specifically, if 0.88≤V1<1.08, the change rate of the induced voltage can be reduced to 0.2% or less from the maximum value of the induced voltage. In addition, if 0.92≤V1≤1.04, the change rate of the induced voltage can be reduced to 0.1% or less from the maximum value of the induced voltage.

In general, in characteristics of an electric motor, not only an induced voltage but also the level of noise is an important characteristic. For example, by adjusting the angles θa and θb as described above, torque ripples can be reduced and consequently noise can be reduced. However, in a case where the angles θb and θd are set at arbitrary angles (e.g., V1<0.88 or 1.08<V1), torque ripples cannot be reduced.

In this embodiment, since the electric motor 1 satisfies the condition of 0.88≤(180−(2×θb))/θd≤1.08, the change rate of an induced voltage can be reduced to 0.2% or less from the maximum value of the induced voltage. In this range, noise reduction (reduction of torque ripples) and design of other elements for maintaining the strength of the electric motor 1 (e.g., setting of the angles θa and θb) can be performed.

First Variation

Figure 9:
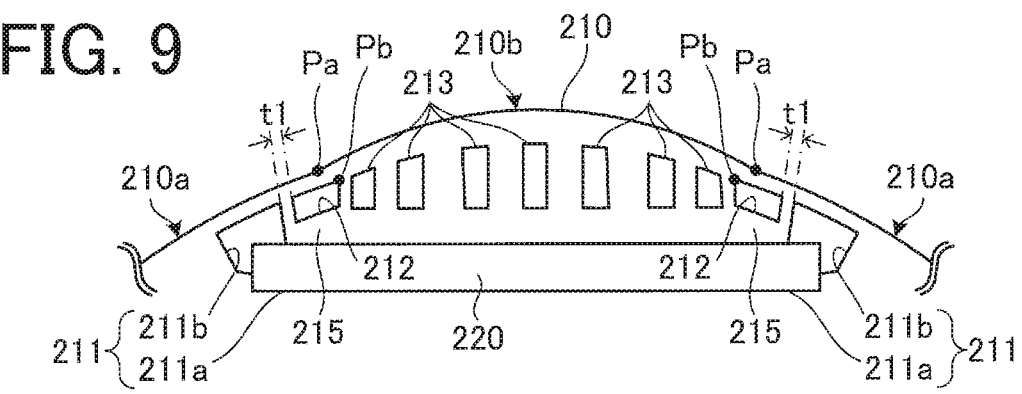
FIG. 9 is a diagram illustrating another example of the structure of the electromagnetic steel sheet.

FIG. 9 is a diagram illustrating another example of the structure of the electromagnetic steel sheet 210.

As illustrated in FIG. 9, the magnet insertion hole 211 may be separated from the slits 212. In the example illustrated in FIG. 9, the slits 212 are separated from the gap portions 211b. In this case, a distance t1 between the slit 212 and the gap portion 211b (specifically, a minimum distance from the slit 212 to the gap portion 211b) is preferably greater than or equal to a thickness t0 of a single electromagnetic steel sheet 210 and less than or equal to 2×t0.

In general, in punching an electromagnetic steel sheet, stress causes strain in the electromagnetic steel sheet and consequently a phenomenon of a decrease in magnetic permeability occurs. The decrease in magnetic permeability due to stress is generally observed to a range about twice as large as the thickness t0 of the electromagnetic steel sheet. Thus, in a case where the distance t1 is less than or equal to 2×t0, a magnetic permeability of an electromagnetic steel sheet between the slit 212 and the gap portion 211b (i.e., a portion indicated by the distance t1) decreases, and thus, magnetic flux leakage can be reduced advantageously, in a manner similar to the functions of the slits 212 and the gap portions 211b.

Thus, by setting the distance t1 at the thickness t0 or more, the process for the magnet insertion holes 211 and the slits 212 (e.g., press work) can be easily performed. Further, by setting the distance t1 to a value less than or equal to twice as large as the thickness t0, magnetic flux leakage can be reduced. Thus, by satisfying t0≤t1≤2×t0, enhancement of processability of the electromagnetic steel sheets 210 and reduction of magnetic flux leakage can be achieved at the same time.

Second Variation

Figure 10:
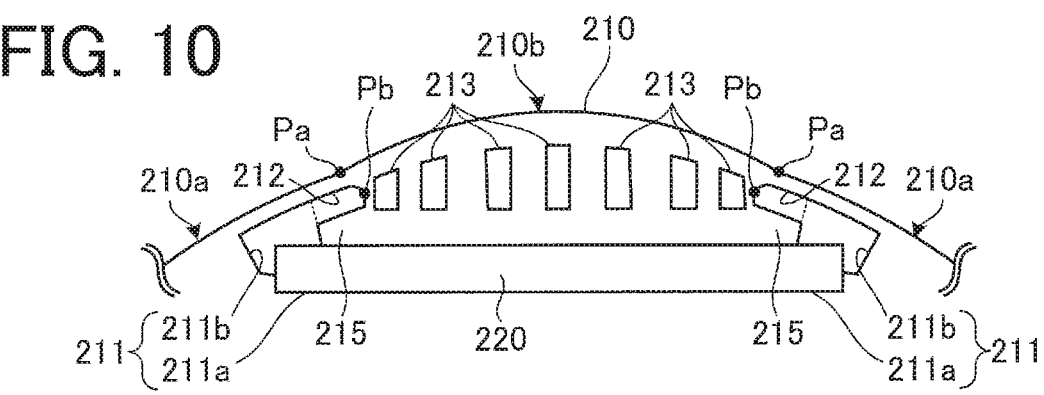
FIG. 10 is a diagram illustrating yet another example of the structure of the electromagnetic steel sheet.

FIG. 10 is a diagram illustrating yet another example of the structure of the electromagnetic steel sheet 210.

As illustrated in FIG. 10, an end portion Pb (inner corner) of each slit 212 on the magnetic pole center side in the circumferential direction may be rounded. In this case, the end portion Pb is located at a position at which a line passing through the rotor center is in contact with the magnetic pole center side of the slit 212 on the xy plane.

Third Variation

Figure 11:
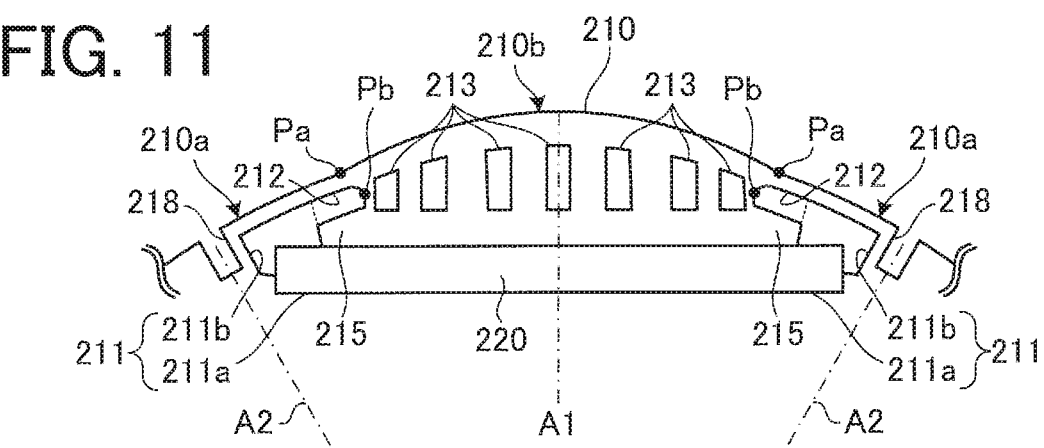
FIG. 11 is a diagram illustrating still another example of the structure of the electromagnetic steel sheet.

FIG. 11 is a diagram illustrating still another example of the structure of the electromagnetic steel sheet 210.

As illustrated in FIG. 11, a depression 218 that is depressed inward in the radial direction may be formed in each of the first outer peripheral surfaces 210a. In this case, the depression 218 includes the inter-pole part (inter-pole A2). That is, the inter-pole A2 passes through the depression 218. Accordingly, the gap between the rotor 2 and the stator 3 can be easily controlled. For example, by forming the depression 218 in the first outer peripheral surface 210a, the magnetic flux density in the inter-pole part can be easily adjusted to zero, and a change of the magnetic flux density in the inter-pole part (e.g., switching from the north pole to the south pole) can be made steep.

For example, in a case where end plates are attached to the both sides of the rotor 2 in the radial direction (specifically, the electromagnetic steel sheet 210) in order to hold the permanent magnet 220, the position of the inter-pole part is not easily detected in some cases. In the third variation, since the depression 218 is formed to include the inter-pole part, the position of the inter-pole part can be easily detected based on the shape of the outer peripheral surface of the electromagnetic steel sheet 210. Accordingly, in a manufacturing process of the electric motor 1, the depression 218 can be used for positioning in performing magnetization of the permanent magnets 220, and assembly of the electric motor 1 can be performed easily.

Advantages of the electric motor 1 according to the first embodiment (including the variations thereof) will be described below.

In the electric motor 1 according to the first embodiment, the distance L1 from the first outer peripheral surface 210a to the stator 3 is larger than the distance L2 from the second outer peripheral surface 210b to the stator 3, the electromagnetic steel sheet 210 includes the slit 212 elongated in the circumferential direction of the rotor 2, and the angles θa and θb satisfy θa<θb. As a result, torque ripples can be reduced, magnetic flux leakage can be reduced, and a decrease in structural strength of the electric motor 1 can be suppressed.

In addition, in the electric motor 1, since the first portion 215 is formed between the slit 212 and the magnet insertion hole 211 (specifically, the magnet insertion portion 211a), it is possible to elongate the slit 212 in the circumferential direction while minimizing the area of a portion of the permanent magnet 220 that is in contact with the air. Accordingly, a decrease in permeance of the permanent magnet 220 can be suppressed while the leakage flux is reduced.

The width of each electromagnetic steel sheet 210 outside the slit 212 in the radial direction, that is, the width of the thin portion 217, increases from the inter-pole part (inter-pole A2) toward the magnetic pole center part (magnetic pole center A1). Accordingly, torque ripples can be reduced and consequently noise of the electric motor 1 can be reduced.

In this embodiment, since the plurality of slits 213 are formed outside the magnet insertion holes 211 in the radial direction, the weight of the electromagnetic steel sheets 210 can be reduced and consequently the centrifugal force can be reduced. Accordingly, stress generated on and around the thin portions 217 can also be reduced.

In the electric motor 1, if the ratio of the number of magnetic poles to the number of the slots 34 is 2:3 and the angle θa is an electrical angle of 30 degrees or more, magnetic flux from the permanent magnets 220 can be effectively used.

Since the angle θb and the angle θd satisfy 1.08≥(180−(2×θb))/θd≥0.88, the magnetic flux from the rotor 2 can be effectively used.

In a case where the first outer peripheral surface 210a has the depression 218 that is depressed inward in the radial direction, a gap between the rotor 2 and the stator 3 can be controlled easily.

In addition, in a case where the electric motor 1 is a permanent magnet-embedded electric motor, the electric motor 1 can effectively use the reluctance torque. In the permanent magnet-embedded electric motor, the sum of torque (magnet torque) by permanent magnets and reluctance torque is torque of the electric motor. Since the reluctance torque is used, the permanent magnet-embedded electric motor performs an operation based on a phase in which magnetic flux flowing from the stator to the rotor is shifted from an inter-pole part (q-axis).

In the electric motor 1 according to this embodiment, as magnetic flux from the stator 3 approaches the boundary Pa as the inflection point and the end portion Pb, force exerted on the rotor 2 approaches the boundary Pa and the end portion Pb. When the magnetic flux from the stator 3 approaches the rotor 2, the force exerted on the rotor 2 changes. In this embodiment, when the magnetic flux from the stator 3 approaches the boundary Pa as an inflection point and the end portion Pb, stress generated on the boundary Pa and the end portion Pb increases. Even in this case, in this embodiment, when the electric motor 1 satisfies θa<θb, the rotor 2 can be configured such that the position of the boundary Pa does not overlap the position of the end portion Pb in the radial direction. As a result, torque ripples can be reduced, magnetic flux leakage can be reduced, and a decrease in structural strength of the electric motor 1 can be suppressed.

In the case of performing an operation in which magnetic flux flowing from the stator into the rotor flows from the inter-pole A2 into the rotor 2 at an angle of θa or more, force is also exerted on the second outer peripheral surfaces 210b in addition to centrifugal force generated in the rotor 2, and thus, stress generated in the boundary Pa and the end portion Pb easily increases. Even in this case, when the electric motor 1 satisfies θa<θb as described above, the rotor 2 can be configured such that the position of the boundary Pa does not overlap the position of the end portion Pb in the radial direction.

In the case of performing an over-modulation operation (also called over-modulation control, field-weakening control, or field-weakening operation) that is an operation using an over-modulation region of a voltage, stress generated on the boundary Pa and the end portion Pb easily increases. This is generally because the over-modulation operation is an operation in which magnetic flux from a stator is advanced and an induced voltage from a rotor is reduced and is an operation based on a phase in which the magnetic flux from the stator is shifted from an inter-pole. Even in this case, when the electric motor 1 satisfies θa<θb as described above, the rotor 2 can be configured such that the position of the boundary Pa does not overlap the position of the end portion Pb in the radial direction.

Second Embodiment

An air conditioner 10 according to a second embodiment of the present invention will be described.

Figure 12:
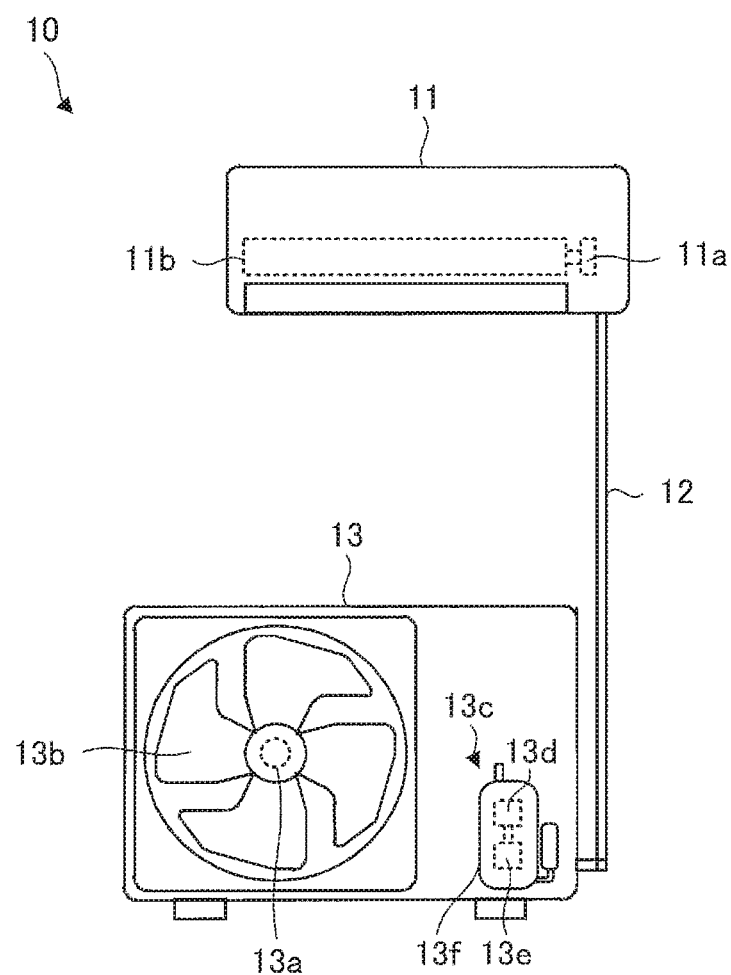
FIG. 12 is a diagram schematically illustrating a configuration of an air conditioner according to a second embodiment of the present invention.

FIG. 12 is a diagram schematically illustrating a configuration of the air conditioner 10 according to the second embodiment of the present invention.

The air conditioner 10 (e.g., a refrigerating air conditioner) according to the second embodiment includes an indoor unit 11 as an air blower (first air blower), a refrigerant pipe 12, an outdoor unit 13 as an air blower (second air blower) connected to the indoor unit 11 by the refrigerant pipe 12.

The indoor unit 11 includes an electric motor 11a (e.g., the electric motor 1 according to the first embodiment) and an air blowing unit 11b that blows air when being driven by the electric motor 11a. The air blowing unit 11b includes, for example, blades that are driven by the electric motor 11a.

The outdoor unit 13 includes an electric motor 13a (e.g., the electric motor 1 according to the first embodiment), an air blowing unit 13b, a compressor 13c, and a heat exchanger (not shown). The air blowing unit 13b is driven by the electric motor 13a, thereby blowing air. The air blowing unit 13b includes, for example, blades that are driven by the electric motor 13a. The compressor 13c includes an electric motor 13d (e.g., the electric motor 1 according to the first embodiment), a compression mechanism 13e (e.g., a refrigerant circuit) that is driven by the electric motor 13d, and a housing 13f covering the electric motor 13d and the compression mechanism 13e.

In the air conditioner 10 according to the second embodiment, at least one of the indoor unit 11 or the outdoor unit 13 includes the electric motor 1 described in the first embodiment (including the variations thereof). Specifically, as a driving source of the air blowing unit, the electric motor 1 described in the first embodiment (including the variations thereof) is applied to at least one of the electric motors 11a or 13a. In addition, as the electric motor 13d of the compressor 13c, the electric motor 1 described in the first embodiment (including the variations thereof) may be used.

The air conditioner 10 can, for example, perform operations such as a cooling operation of sending cold air and a heating operation of sending warm air from the indoor unit 11. In the indoor unit 11, the electric motor 11a is a driving source for driving the air blowing unit 11b. The air blowing unit 11b can send conditioned air.

The electric motor 1 described in the first embodiment (including the variations thereof) can be mounted on equipment including a driving source, such as a ventilator, a home appliance, or a machine tool, in addition to the air conditioner 10.

In the air conditioner 10 according to the second embodiment, the electric motor 1 described in the first embodiment (including the variations thereof) is applied to at least one of the electric motors 11a or 13a, and thus, advantages similar to those described in the first embodiment can be obtained.

In addition, in the second embodiment, the use of the electric motor 1 described in the first embodiment (including the variations thereof) allows the air blowers (the indoor unit 11 and the outdoor unit 13), the compressor 13c, and the air conditioner 10 to have high operating efficiency.

Furthermore, in the second embodiment, the use of the electric motor 1 described in the first embodiment (including the variations thereof) allows the air blowers (the indoor unit 11 and the outdoor unit 13), the compressor 13c, and the air conditioner 10 to reduce noise.

Features of the embodiments and features of the variations described above can be combined as appropriate.

What is claimed is:

1. An electric motor comprising:
   a stator including a tooth; and
   a rotor disposed inside the stator, including a permanent magnet and an electromagnetic steel sheet, and having a plurality of magnetic poles, wherein the electromagnetic steel sheet includes
a magnet insertion hole in which the permanent magnet is inserted,
a first outer peripheral surface including an inter-pole part located at a position between two adjacent magnetic poles of the plurality of magnetic poles,
a second outer peripheral surface adjacent to the first outer peripheral surface and including a magnetic pole center part located at a center of the permanent magnet, and
a first slit formed outside the magnet insertion hole in a radial direction of the rotor, the first slit being elongated in a circumferential direction of the rotor,
a minimum distance from the first outer peripheral surface to the stator is larger than a minimum distance from the second outer peripheral surface to the stator,
the electric motor satisfies $\theta a < \theta b$
where $\theta a$ is a first angle formed, on a first plane that is a plane perpendicular to an axial direction, by a first line from a boundary between the first outer peripheral surface and the second outer peripheral surface to a rotation center of the rotor on the first plane and a second line passing through the inter-pole part of the rotor and the rotation center,
$\theta b$ is a second angle formed, on the first plane, by the second line and a third line passing through the rotation center and an end portion of the first slit on a magnetic pole center side in the circumferential direction; and
the electric motor satisfies $0.88 \leq (180-(2 \times \theta b))/\theta d \leq 1.08$ where
$\theta d$ is an angle formed by a line passing through one end portion of the tooth in the circumferential direction and the rotation center and a line passing through another end of the tooth in the circumferential direction and the rotation center, on the first plane.

2. The electric motor according to claim 1, wherein a width of the electromagnetic steel sheet outside the first slit in the radial direction increases from the inter-pole part toward the magnetic pole center part.

3. The electric motor according to claim 1, wherein the electromagnetic steel sheet is formed outside the magnet insertion hole in the radial direction, and includes a plurality of second slits each extending in the radial direction and being parallel to each other.

4. The electric motor according to claim 1, wherein the stator includes a plurality of slots,
a ratio of the number of the plurality of magnetic poles to the number of the plurality of slots is 2:3, and
the first angle is greater than or equal to an electrical angle of 30 degrees.

5. The electric motor according to claim 1, wherein the first outer peripheral surface includes a depression that is depressed inward in the radial direction.

6. A compressor comprising:
the electric motor according to claim 1;
a compression mechanism to be driven by the electric motor; and
a housing covering the electric motor and the compression mechanism.

7. An air blower comprising:
the electric motor according to claim 1; and
an air blowing unit to be driven by the electric motor.

8. An air conditioner comprising:
an indoor unit; and
an outdoor unit connected to the indoor unit, wherein
at least one of the indoor unit or the outdoor unit includes the electric motor according to claim 1.

9. The electric motor according to claim 1, wherein the electromagnetic steel sheet includes a first portion formed between the first slit and the magnet insertion hole, the first portion being a portion of the electromagnetic steel sheet.

10. The electric motor according to claim 9, wherein the first portion is formed along the first slit and is elongated in the circumferential direction.

* * * * *